US007612656B2

(12) United States Patent
Koie et al.

(10) Patent No.: US 7,612,656 B2
(45) Date of Patent: Nov. 3, 2009

(54) COMMUNICATION DEVICE AND METHOD FOR CONTROLLING THE SAME

(75) Inventors: Yoshio Koie, Handa (JP); Hiroshi Sakai, Okazaki (JP); Masaru Hotta, Anjo (JP)

(73) Assignee: DENSO Corporation, Kariya (JP)

( * ) Notice: Subject to any disclaimer, the term of this patent is extended or adjusted under 35 U.S.C. 154(b) by 220 days.

(21) Appl. No.: 11/471,314

(22) Filed: Jun. 20, 2006

(65) Prior Publication Data

US 2007/0063825 A1 Mar. 22, 2007

(30) Foreign Application Priority Data

Jun. 27, 2005 (JP) ............................ 2005-186493

(51) Int. Cl.
*B60Q 1/00* (2006.01)

(52) U.S. Cl. ............ 340/425.5; 340/426.1; 340/426.18

(58) Field of Classification Search ............ 340/426.18
See application file for complete search history.

(56) References Cited

U.S. PATENT DOCUMENTS 5,673,304 A * 9/1997 Connor et al. ................ 379/45
2004/0091085 A1* 5/2004 Suganuma et al. ............ 379/45
2005/0181837 A1 8/2005 Sakai
2005/0198547 A1* 9/2005 Morse et al. ................ 713/330

OTHER PUBLICATIONS

Research Disclosure (Database No. 459042), "Method for preventing termination of a wireless emergency call by the initiator", Frank Overstreet, et al., Jul. 2002.*
U.S. Appl. No. 11/351,194, filed Feb. 2006, Koie.
U.S. Appl. No. 11/369,915, filed Mar. 2006, Shinoda.
Office Action dated May 8, 2009 in the corresponding Chinese patent application No. 200610094147.7 with English translation thereof.

* cited by examiner

*Primary Examiner*—Toan N Pham
*Assistant Examiner*—Kerri McNally
(74) *Attorney, Agent, or Firm*—Harness, Dickey & Pierce, PLC

(57) ABSTRACT

A communication device is held in a controlled condition when the communication device is in a process of an emergency operation. The emergency operation of the communication device including a response operation in response to an incoming call that is transmitted from an emergency service center in exchange for an emergency signal from the communication device completes even when an external device provides a reset cause for the communication device in the process of the emergency operation due to provision of a control signal for controlling the controlled condition.

10 Claims, 2 Drawing Sheets

COMMUNICATION DEVICE AND METHOD FOR CONTROLLING THE SAME

CROSS REFERENCE TO RELATED APPLICATION

This application is based on and claims the benefit of priority of Japanese Patent Application No. 2005-186493 filed on Jun. 27, 2005, the disclosure of which are incorporated herein by reference.

FIELD OF THE INVENTION

The present invention generally relates to a communication device.

BACKGROUND OF THE INVENTION

Conventionally, a communication device for use in a vehicle transmits an emergency signal to an emergency service center through a radio communication unit, and receives an incoming call from the service center in waiting state. At the same time, the communication device receives a reset signal from an external device for resetting and restarting. Therefore, the reset signal received from the external device interrupts the waiting state of the communication device.

For example, an input such as an emergency button signal from an emergency button, an airbag deployment signal from an airbag ECU arranges the communication device in waiting state of an emergency operation for reception of the incoming call from the service center after transmission of the emergency signal to the service center. At approximately the same time, the same communication device receives the reset signal for synchronous startup operation of the communication device with a navigation system that is connected thereto through a USB interface. In this case, the communication device in waiting for the incoming call after the transmission of the emergency signal to the service center is put into reset operation before receiving the incoming call. As a result, the emergency operation of the communication device is interrupted and aborted.

The communication device disclosed in Japanese patent document JP-2005-58950 uses a non-volatile memory for storing an operation status of the communication device. That is, the emergency operation of the communication device is stored in the memory once the communication device has started the emergency operation. In this manner, the communication device refers to the non-volatile memory and resumes the emergency operation after resetting the communication device in a case where the emergency operation is interrupted by the reset signal received from the external device.

However, the communication device disclosed in the above document cannot answer the incoming call from the service center until it finishes the reset operation once the device is put into a process of the reset operation upon receiving the reset signal from the external device.

SUMMARY OF THE INVENTION

In view of the above-described and other problems, the present invention provides a communication device that appropriately answers an incoming call from a service center even when the communication device is having a cause for resetting.

A communication device of the present invention includes a radio unit for communication with a service center, wherein the radio unit transmits an emergency signal to a service center and receives the incoming call from the service center in response to the emergency signal, a control unit for causing an emergency operation including transmission of the emergency signal from the radio unit upon receiving an emergency trigger and for causing a reset operation upon receiving a reset signal and a signal detector for outputting the reset signal to the control unit upon detecting a cause of reset. The control unit of the communication device outputs a control signal to the signal detector without interruption upon receiving the emergency trigger until the radio unit answers the incoming call, and the signal detector of the communication device is held in a controlled condition that prohibits output of the reset signal to the control unit while the signal detector receives the control signal from the control unit. In this manner, an interruption of the emergency operation of the communication device for the cause of the reset operation triggered by the external device is prevented by prohibiting the output of the reset signal from the signal detector to the control unit. Therefore, the emergency operation of the communication device is appropriately conducted and completed even when the reset signal for resetting the communication device is initiated by the external device. That is, the communication device can appropriately answer the incoming call from the service center in the emergency operation before the reset operation is initiated.

In another aspect of the communication device of the present invention, the controlled condition of the signal detector is released when the control signal from the control unit to the signal detector is terminated. In this manner, the signal detector can output the reset signal to the control unit upon completion of a process of the emergency operation, thereby enabling the communication device to be restarted in an appropriate manner.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

An embodiment of the present invention are described with reference to the drawings. In the present embodiment of a communication device 1, a navigation system is connected to the communication device 1 through a USB interface as an external device.

Figure 1:
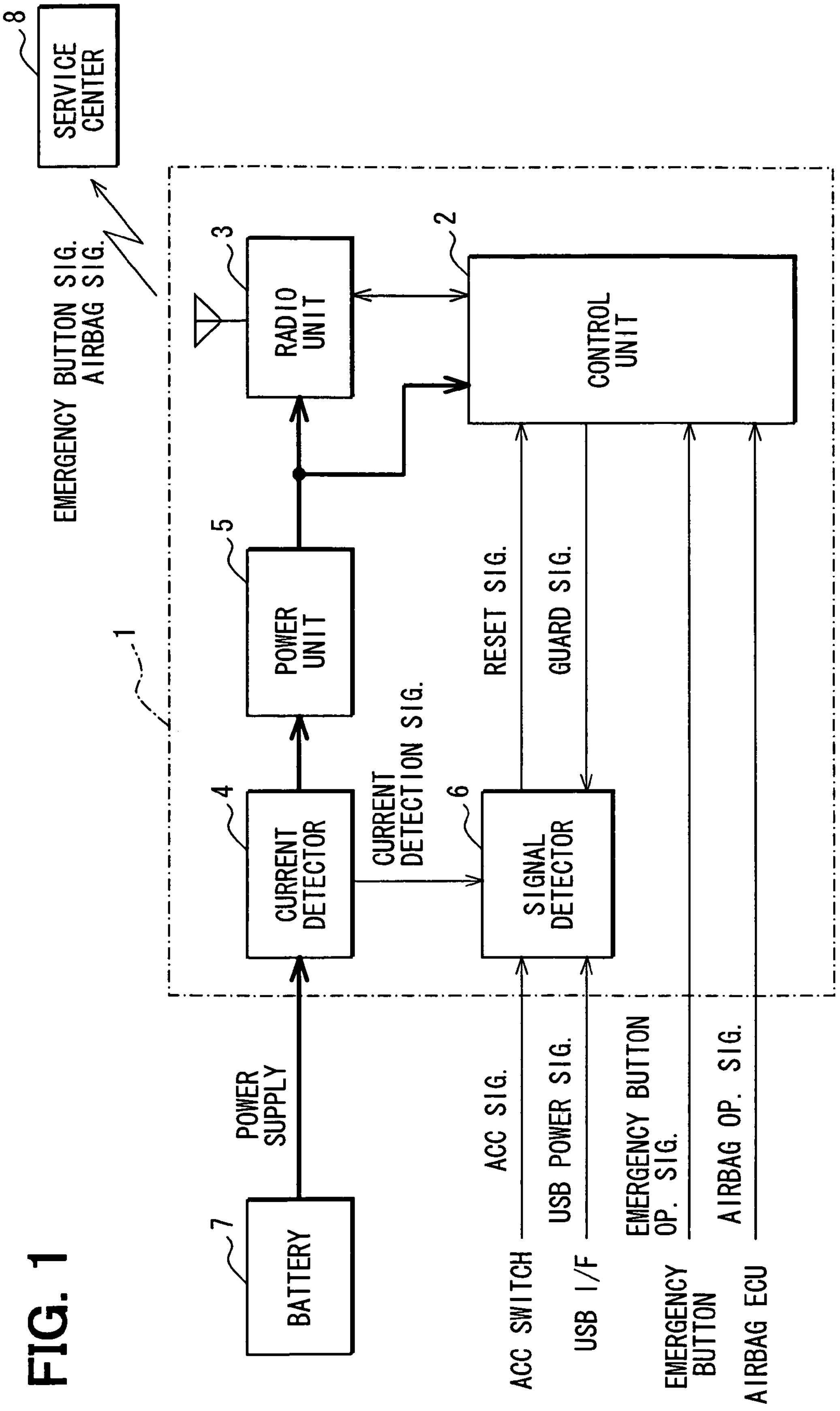
FIG. 1 shows a block diagram of a communication device in an embodiment of the present invention.

FIG. 1 shows a block diagram of the communication device 1 in an embodiment of the present invention. The communication device 1 includes a control unit 2, a radio unit 3, a power detector 4, a power unit 5 and a signal detector 6.

The control unit 2 operates on a power supply from the power unit 5, and controls operation of the radio unit 3. More practically, the control unit 2 controls the radio unit 3 to transmit an emergency button signal to a service center 8 upon receiving an emergency button operation signal from an emergency button. In this case, the emergency button is under control of a user of a vehicle. The control unit 2 also controls the radio unit 3 to transmit an airbag signal to the service center 8 upon receiving an airbag operation signal from an airbag ECU when deployment of the airbag operation signal is detected. In this case, reception of the emergency button operation signal or the airbag operation signal by the control unit 2 means that an emergency operation of the communication device 1 is triggered.

The power detector 4 outputs a current detection signal to the signal detector 6 upon receiving power supply from the battery 7. The signal detector 6 outputs a reset signal to the control unit 2 when an accessory signal from an ACC switch or a USB power turn-on signal from the USB interface is detected by the signal detector 6. The reset signal to the control unit 2 is outputted on condition that no guard signal is provided from the control unit 2 to the signal detector 6. The control unit 2 initiates a reset operation when it receives the reset signal from the signal detector 6. In this case, inputting of the accessory signal or the USB power turn-on signal to the signal detector 6 means that a reset operation is initiated by the external device.

Figure 2:
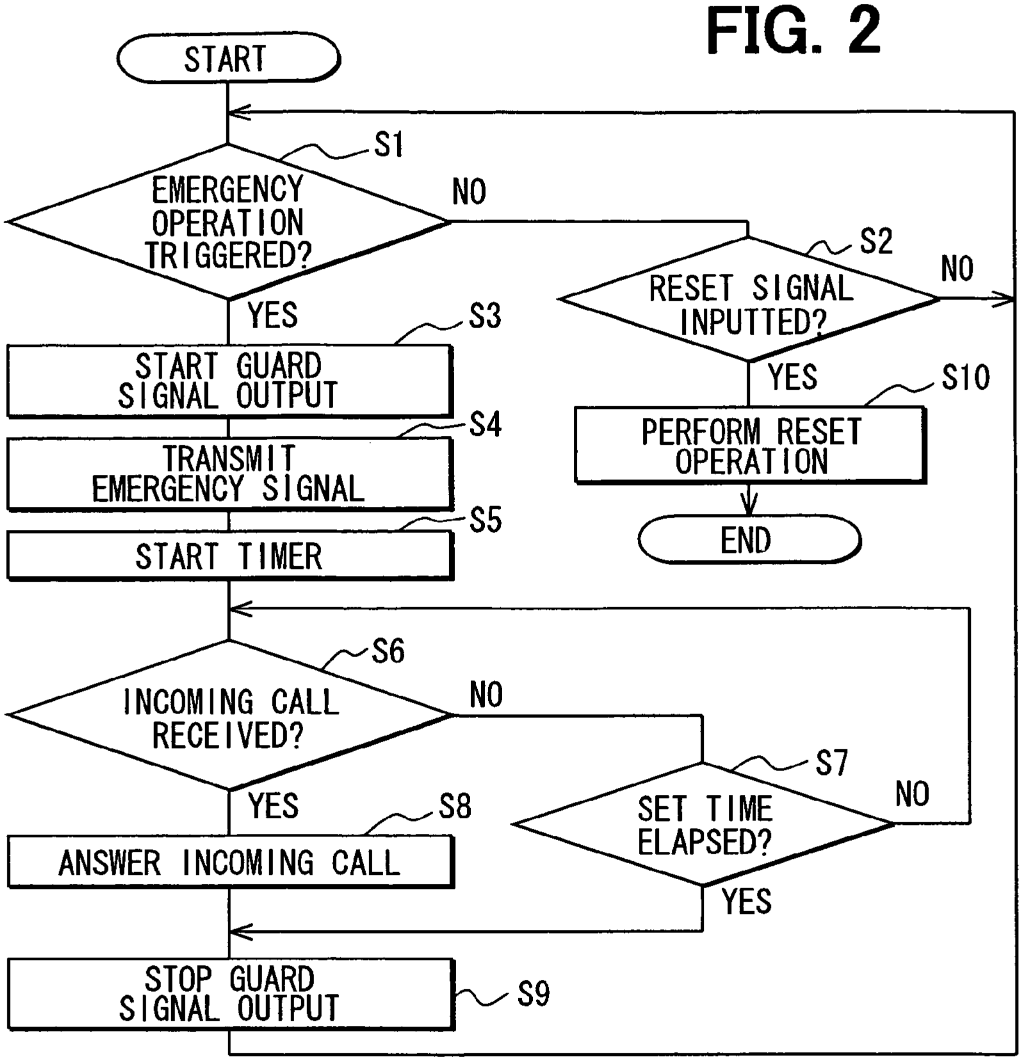
FIG. 2 shows a flowchart of a process executed in a control unit.
Figure 3:
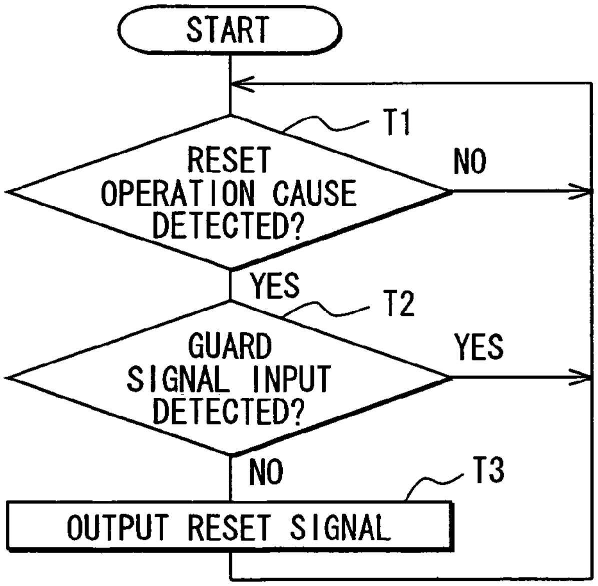
FIG. 3 shows a flowchart of a process executed in a signal detector.

FIG. 2 shows a flowchart of a control process executed in the control unit 2, and FIG. 3 shows a flowchart of a detection process executed in the signal detector 6.

The control unit 2 in the communication device 1 executes the control process that determines whether an emergency operation trigger, that is, the emergency button operation signal or the airbag operation signal, is inputted in step S1. The control process proceeds to step S2 when the trigger is not detected (step S1:NO), and the control process proceeds to step S3 when the trigger is detected (step S1:YES).

In step S2, the control process determines whether the reset signal is inputted from the signal detector 6. The control process proceeds to step S1 when reset signal input is detected (step S2:YES). The control process returns to step S1 when input of the reset signal from the signal detector 6 is not detected (step S2:NO).

In step S3, the control process starts outputting of the guard signal to the signal detector 6.

The signal detector 6 in the communication device 1 executes the detection process for detecting reset cause. That is, the process determines whether the accessory signal or the USB power turn-on signal from the external device is detected in step T1. The detection process proceeds to step T2 when the reset cause is detected (step T1:YES). The detection process repeats step T1 when the reset cause is not detected (step T:NO).

In step T2, the detection process determines whether the guard signal from the control unit 2 is inputted. The detection process returns to step T1 when the guard signal is detected (step T2:YES). The detection process proceeds to step T3 when the guard signal is not detected (step T2:NO).

In step S4 of the control process in the control unit 2, the process transmits an emergency signal (i.e., the emergency button signal or the airbag signal) to the service center 8 after starting output of the guard signal to the signal detector 6.

In step S5, the control process waits for an incoming call from the service center 8 and starts timer for counting wait period. The wait period for waiting the incoming call from the service center 8 is, for example, several minutes in this case.

In step S6, the control process determines whether the incoming call from the service center 8 is received. The control process proceeds to step S8 when the incoming call from the service center 8 is received (step S6:YES). The control process proceeds to step S7 when the incoming call from the service center 8 is not received (step S6:NO).

In step S7, the control process determines whether a set time is elapsed after transmission of the emergency signal. The control process returns to step S6 until the wait period counted by the timer reaches the set time. The control process proceeds to step S9 when the wait period reaches the set time.

In step S8, the control process answers the incoming call from the service center 8.

In step S9, the control process stops the output of the guard signal to the signal detector 6.

In other words, the control unit 2 answers the incoming call from the service center 8 and stops the output of the guard signal to the signal detector 6, when the incoming call arrives before the wait period reaches the set time. The control unit 2 stops the output of the guard signal to the signal detector 6 without answering the incoming call when the incoming call arrives after the wait period reaches the set time. In both cases, the control process in the control unit 2 returns to step S1 after stopping the output of the guard signal to the signal detector 6.

In step S10, the control process performs the reset operation of the communication device 1. That is, the signal detector 6 detects termination of the guard signal from the control unit 2 (step S2) and initiates the reset operation by outputting the reset signal to the control unit 2 (step T3). The control unit 2 receives the reset signal from the signal detector 6 and performs the reset operation. This concludes the control process and the detection process.

The present embodiment of the communication device 1 controls the emergency operation in the above described manner. That is, the communication device 1 answers the incoming call from the service center 8 in the wait period without being interrupted by the reset signal from the signal detector 6 triggered by the input from the external device such as the ACC switch or the USB interface, because the reset signal is blocked by the guard signal transmitted from the control unit 2. Therefore, the communication device 1 can appropriately answer the incoming call from the service center 8.

Further, the communication device 1 performs the reset operation after appropriately completing the response to the incoming call from the service center 8 because the guard signal from the control unit 2 to block the reset signal is terminated after responding the incoming call. Therefore, the reset operation of the communication device 1 is appropriately completed.

Although the present invention has been fully described in connection with the preferred embodiment thereof with reference to the accompanying drawings, it is to be noted that various changes and modifications will become apparent to those skilled in the art.

For example, the trigger of the emergency operation may be inputted to the control unit 2 from a different sensor or device other than the emergency button or the airbag ECU.

Further, reset cause from the external device may be detected as a signal that is different from the accessory signal from the ACC switch, the USB power turn-on signal from the USB interface.

Such changes and modifications are to be understood as being within the scope of the present invention as defined by the appended claims.

What is claimed is:

1. A communication device comprising:

a radio unit for communication with a service center, wherein the radio unit transmits an emergency signal to the service center, receives an incoming call from the service center in response to the emergency signal and answers the incoming call;

a control unit for causing an emergency operation upon receiving an emergency trigger and for causing a reset operation which restarts the communication device upon receiving an automatically generated reset signal in response to a power turn-on signal; and a signal detector for outputting the reset signal to the control unit upon detecting a cause of reset; wherein the control unit outputs a continuous guard signal to the signal detector upon receiving the emergency trigger;

the signal detector is held in a controlled condition that prohibits output of the reset signal to the control unit as long as the signal detector receives the guard signal from the control unit; and the control unit discontinues output of the guard signal when the incoming call is received and answered; wherein the power turn-on signal is provided by a navigation system.

2. The communication device as in claim 1, wherein the controlled condition of the signal detector is released when the guard signal from the control unit to the signal detector is terminated.

3. The communication device as in claim 1 wherein the control unit terminates the guard signal after a predetermined period of time.

4. The communication device as in claim 1 wherein the control unit discontinues output of the guard signal immediately after the incoming call is received.

5. A method for controlling a communication device, the communication device having a radio unit for transmitting an emergency signal to a service center and receiving an incoming call from the service center in response to the emergency signal, a control unit for causing an emergency operation that includes transmission of the emergency signal by the radio unit upon receiving an emergency trigger, the transmission accompanied by a response to reception of the incoming call by the radio unit and for causing a reset operation which restarts the communication device upon receiving an automatically generated reset signal in response to a power turn-on signal, and a signal detector for outputting the reset signal to the control unit upon detecting a cause of reset, the method comprising:

outputting a guard signal to the signal detector upon receiving the emergency trigger until the radio unit answers the incoming call;

holding the signal detector in a controlled condition that prohibits output of the reset signal to the control unit while the signal detector receives the guard signal from the control unit; and providing the power turn-on signal from a navigation system.

6. The method as in claim 5 further comprising:

having the signal detector released from the controlled condition when the guard signal from the control unit to the signal detector is terminated.

7. The method as in claim 5 further comprising terminating the guard signal after a predetermined period of time.

8. A method for controlling a communication device having a control unit in communication with a signal detector and a radio unit, the method comprising:

causing an emergency operating of the control unit that includes transmission of an emergency signal to a service center by the radio unit in response to an emergency trigger;

outputting a guard signal from the control unit to the signal detector in response to the emergency trigger;

receiving an incoming call from the service center by the radio unit in response to the emergency signal;

answering the incoming call from the service center;

automatically generating a reset signal in the signal detector in response to a power turn-on signal received by the signal detector;

prohibiting a reset operation which restarts the communication device in response to the reset signal while the guard signal is received by the signal detector; and providing the power turn-on signal from a navigation system.

9. The method as in claim 8 wherein the prohibiting step includes holding the signal detector in a controlled condition that prohibits output of the reset signal to the control unit.

10. The method as in claim 8 further comprising performing the reset operation after a predetermined period of time.

* * * * *